(12) United States Patent
Woering

(10) Patent No.: US 8,582,178 B2
(45) Date of Patent: Nov. 12, 2013

(54) METHOD FOR ADJUSTING THE AMOUNT OF MARKING MATERIAL IN A PRINTED IMAGE

(71) Applicant: OCE-Technologies B.V., Venlo (NL)

(72) Inventor: Jantinus Woering, Venlo (NL)

(73) Assignee: OCE-Technologies B.V., Venlo (NL)

( * ) Notice: Subject to any disclaimer, the term of this patent is extended or adjusted under 35 U.S.C. 154(b) by 0 days.

(21) Appl. No.: 13/765,387

(22) Filed: Feb. 12, 2013

(65) Prior Publication Data

US 2013/0176581 A1 Jul. 11, 2013

Related U.S. Application Data

(63) Continuation of application No. PCT/EP2011/066841, filed on Sep. 28, 2011.

(30) Foreign Application Priority Data

Oct. 7, 2010 (EP) .................................... 10186879

(51) Int. Cl.
- *G06K 15/02* (2006.01)
- *H04N 1/46* (2006.01)
- *B41J 2/47* (2006.01)

(52) U.S. Cl.
USPC ............. 358/1.9; 358/504; 358/517; 347/251

(58) Field of Classification Search
USPC ...................... 358/1.9, 504, 517, 1.2; 347/251
See application file for complete search history.

(56) References Cited

U.S. PATENT DOCUMENTS

| 5,237,344 | A | | 8/1993 | Tasaki et al. |
| 5,483,625 | A | | 1/1996 | Robertson et al. |
| 5,563,985 | A | | 10/1996 | Klassen et al. |
| 5,649,071 | A | * | 7/1997 | Klassen et al. ................. 358/1.9 |
| 6,069,709 | A | | 5/2000 | Harrington |

FOREIGN PATENT DOCUMENTS

EP    1 998 273 A1    12/2008

OTHER PUBLICATIONS

International Search Report, mailed Jan. 5, 2012, issued in PCT/EP2011/066841.
Written Opinion of the International Searching Authority, mailed Jan. 5, 2012, issued in PCT/EP2011/066841.

* cited by examiner

*Primary Examiner* — Charlotte M Baker
(74) *Attorney, Agent, or Firm* — Birch, Stewart, Kolasch & Birch, LLP

(57) ABSTRACT

A method for reducing an amount of marking material for printing a binary image on a receiving material uses a printing process configured to apply print pixels and to associate each image pixel with at least two print pixels. A print signal is generated indicating for each print pixel whether marking material is to be applied. The print signal is filtered by a predefined mask that defines for which print pixels no marking material will be applied independent of the pixel value of the associated image pixel. The print pixels that are blocked by the mask define a regular pattern to avoid graininess in the printed image. The main effect on print quality is a reduction of the contrast in the image. By choosing one of a set of at least two masks, the user selects the amount of reduction that is realized in the print process.

9 Claims, 3 Drawing Sheets

METHOD FOR ADJUSTING THE AMOUNT OF MARKING MATERIAL IN A PRINTED IMAGE

BACKGROUND OF THE INVENTION

1. Field of the Invention

The present invention relates to a method for reducing an amount of marking material to be used for printing an image on a receiving material using a print process. The present invention further relates to a print engine, configured to perform said method.

2. Description of the Related Art

Many known print processes for reproducing documents and images are arranged to work with a binary print signal that indicates whether or not a fixed amount of marking material is to be applied for a predefined print pixel. The marking material is for example toner or ink. The print pixels are regularly distributed on a receiving material. In color print processes, several process colors are used to obtain a full color output, each of the process colors being developed individually by an associated binary print signal.

A binary image is usually a two-dimensional array of pixels, wherein each image pixel has one of two values that indicates whether or not to mark a print pixel associated with the image pixel. In a print engine, binary images are used to generate the print signals for the various process colors. The binary images may stem from a computing device that accepts print jobs and transforms images from documents to be printed into printable data by applying different methods of image processing, among which color management, smoothing and sharpening, brightness and contrast adjustment, and halftoning. A binary image for a print engine is printer specific, meaning that the printed output of one and the same binary image on different print engines may be different.

It is advantageous to be able to influence the quality of the printed output by selecting various settings for the image processing modules, such as the amount of sharpening to be applied, the amount of contrast, etc., along with settings that may be selected for the print job, such as whether or not a staple is needed, if the job is to be printed one- or double-sided, etc. It is possible, for example, to make the printed output look lighter, thereby using less toner, by selecting a setting affecting the lightness in one of the image processing modules, such as a transfer function or a halftoning module. However, once a binary image is transmitted to the print engine, it is usually not possible anymore to change the appearance or characteristics of the image.

In some print processes, it is necessary to reduce the amount of marking material, since the receiving material is unable to handle the maximum amount that may be applied locally. This may be done in the image processing modules, but, since the amount of reduction may depend on the receiving material that is used, it is advantageous to be able to do this reduction after the binary image is transmitted to the print engine. Various names are used for such reduction method, among which dot thinning, toner save method, ink reduction etc. The reduction of marking material may also be wanted for economical reasons to reduce the cost of the printed output, or for ecological reasons.

In U.S. Pat. No. 5,237,344, a method for dot thinning is described for ink jet processes in which a local dot density is calculated and thinning means are activated to reduce the number of dots that are discharged on the recording medium. The thinning information is pre-stored in a memory with the font data. In U.S. Pat. No. 5,563,985, the dot thinning is extended to color printing. The thinning means herein use a random selection of pixels that are set to OFF to prevent moire between the thinning patterns of the various process colors. In U.S. Pat. No. 5,483,625, a regular thinning pattern is used in combination with horizontal and vertical line preservation to prevent features to be washed out of an image and text becoming unrecognizable. All these methods use a kind of selection mechanism to determine if a print position may be elected for withholding its marking material that otherwise would be transferred to the receiving medium. This selection mechanism leads to rather complicated electronic circuits.

An object of the invention is to provide a simple method for reducing the amount of toner in the printed output from a binary image without affecting the information content of the image.

SUMMARY OF THE INVENTION

According to the present invention, each image pixel is associated with at least two print pixels. Each of these print pixels take the value of the associated image pixel. Filtering the values of the print signal, related to the print pixels, by a predefined mask that sets the print value for a number of print pixels to not marking the receiving material, independent of the pixel value of the associated image pixel, may remove only part of the information comprised in the image pixel. Therefore the information may still be rendered, but with less marking material than without the application of the mask.

In an embodiment, the print pixels for which no marking material will be applied are arranged in a regular pattern. This has the advantage that graininess in the printed image is avoided.

In an embodiment, the repetition length of the mask, which is the number of pixels between repetitive sequences of mask values, is three print pixels. Experimentally it has been found that this repetition length has the least chance of interference with the various halftone screens that may be used in the binary image.

In an embodiment, for each image pixel at least one of the associated print pixels is set to apply marking material or not, in accordance with the pixel value of the associated image pixel. This ensures that the information comprised in an image pixel will always be rendered in a print pixel.

In an embodiment, the printing process is configured to have a first print resolution, which corresponds to a number of print pixels per unit length, in a first direction and a second print resolution in a second direction, wherein the two directions are perpendicular to each other and the two print resolutions are substantially different from each other. The print resolution is often determined in one direction by a configuration of physical elements that apply marking material in the printing process. The print resolution in the direction perpendicular to the previous one is determined by the frequency of refreshing the print signal for these elements. The image pixels usually represent a square part of the image and are thus associated with a resolution that is equal in both directions. With a different print resolution in the two perpendicular directions, the print pixels are rectangular and fit within the associated square image pixel.

In an embodiment, the marking material is toner. The toner is developed from a collection of particles, e.g. a roll covered by toner particles which react to a physical field, such as an electric field. The switching of the print signal causes this physical field to change from attracting toner particles to not attracting toner particles, which marks the transition between image parts. In contrast with ink, toner applied for one print pixel does not spread so easily to another print pixel. Therefore toner may be conveniently restricted to the print pixel.

In an embodiment, the toner is applied to print pixels in a row in an axial direction of a rotating cylinder with electrodes in a circumferential direction of the cylinder, the electrodes being able to attract or not attract the toner, wherein a print resolution, which corresponds to a number of print pixels per unit length, in the circumferential direction, is selectable. In this embodiment, the print signal activates the electrodes and toner development can not extend to the area of a next electrode, whereas in the direction of the electrode the print signal may be changed with a frequency that is adjusted to the rotation velocity of the cylinder. By a proper selection of the frequency for changing the print signal, the print resolution in the circumferential direction can be set.

In another embodiment, the level of reducing the amount of marking material is selected by a user by selecting one of a set of at least two available masks. In this embodiment, the user is given control over the quality of the print in relation to the amount of marking material that is to be used, and thus provides additional control for the image processing of the binary image.

The invention may be embodied in a print engine that is configured to print a binary image by a print process, the print engine comprising a module for filtering the print signal associated with the binary image by a mask that reduces the amount of marking material that is to be used in the print process according to one of the previously mentioned methods.

BRIEF DESCRIPTION OF THE DRAWINGS

Hereinafter, the present invention is further elucidated with reference to the appended drawings showing non-limiting embodiments and wherein.

DETAILED DESCRIPTION OF THE PREFERRED EMBODIMENTS

Figure 1:
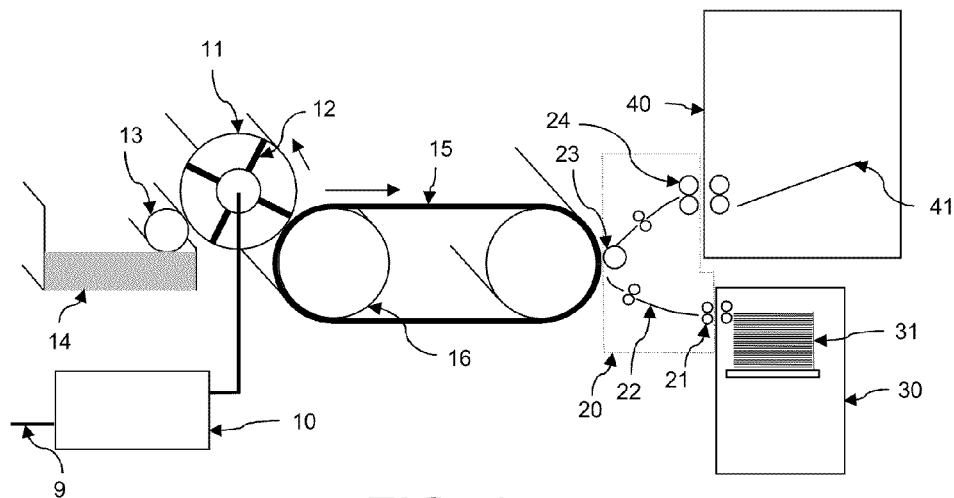
FIG. 1 shows a schematic, perspective view of a print engine in which an embodiment of the method according to the invention may be used.

The present invention will now be described with reference to the accompanying drawings, wherein the same reference numerals have been used to identify the same or similar elements throughout the several views.

FIG. 1 shows a print engine for printing binary images. The print engine comprises a converter 10 to convert image data into print signals, an image forming module 11 to apply marking material corresponding to the print signal, the marking material being brought in contact with the image forming module by a developing roller 13, a transfer module 15 for transferring the marking material to the image fixing module 20, a receiving material input module 30 and a finished output product module 40. In this embodiment, the marking material is conventionally toner, which comprises a resin that is softened by heat.

The binary image data are supplied to the print engine through a data connection 9. This may be a conventional USB- or Firewire-bus or any other suitable data connection, depending among other things on the required bandwidth. The converter 10 comprises electronic circuits including programmable logic to convert image lines into print signals that are adapted to be applied to the image forming module 11. In FIG. 1, a rotatable image forming module is shown that has electronic devices in the inside of a roll, which is a substantially cylindrically shaped element, to apply a voltage on conductive tracks under a dielectric layer on an outer surface of the roll. This voltage generates a local electric field outside the roll that attracts toner from developing roller 13. In this way, an image of toner particles is formed on the surface of the image forming module 11. The toner is supplied from a toner supply unit 14. At predefined times, as defined by a line clock, the voltage for a row of print pixels parallel to the developing roller is set. This line clock defines the print resolution in the circumferential direction of the image forming module. Depending on the rotation speed of the roll, the print resolution may be 600 dpi, equal to the resolution of the conductive tracks, or 1200 dpi or 2400 dpi.

Alternatively, the image forming module 11 may comprise a roll with a photoconducting layer on the outside surface of the roll. In such embodiment, the surface of the photoconductive layer is charged to a high voltage by e.g. a corona and the print signals are applied to an imaging unit outside the roll. The imaging unit may comprise a LED-bar, or a laser scan module, that locally illuminates the layer conform the image to be printed. The photoconductivity of the layer results in a locally discharged surface. The discharged parts of the photoconductive layer may be used to attract toner from a toner roller like developing roller 13 by creating an electric field between these discharged parts and the toner roller. In an embodiment, an electric field between the charged parts and the toner roller may be provided by connecting the toner roller to a ground voltage. The toner may comprise electrical conducting particles having a specified color or a mixture of isolating colored particles and carrier particles that charge the isolating particles, making them sensitive to the electric field between the developing roller and the image forming module. Instead of carrier particles, the developing roller may also be supplemented by a contact roller that charges the toner particles. Therefore, there are various ways to obtain a tangible image of toner particles on the surface of the image forming module. In the process of forming the image, the module rotates in the direction indicated by the arrow in FIG. 1. It is further noted that in another embodiment, an imaging forming module may be formed by arranging a belt with a photoconductive layer on several rollers.

The transfer module 15 comprises a transfer belt and two guiding rolls 16. The belt rotates in congruence with the image forming module and receives the toner image in the nip where the two modules are in contact. The transfer of toner may take place by the influence of mechanical forces that are induced when the top layer of the belt comprises an elastic, adhesive material, such as rubber, or by the influence of electric forces that originate from a voltage difference between the image forming module and the transfer belt. The transfer module may further comprise heating units, which are not shown in the figure, to control the temperature of the belt. Only one image forming module is shown in FIG. 1, but the transfer module may be configured to have several image forming modules around it, each for a different process color of toner particles, that are collected on the belt. In this way a full color image may be formed, e.g. by the process colors cyan, magenta, yellow and black. The transfer module may also be configured as a drum with an outer layer that collects the various color particles.

The image fixing module 20 is able to transport a receiving material by transport rolls 21 and guiding means 22 to a pressure roller 23, that brings the receiving material into contact with the transfer belt. By applying heat and pressure, the toner is brought onto the receiving material, such as paper, which is transported further in the direction of the fusing rolls 24. The image fixing module may comprise a path for turning the receiving material to be able to print the back side. The fusing rolls 24 raise the temperature of the output product to enhance the printed image quality. When the temperature of the pressure roller 23 is sufficiently high, no fusing rolls are necessary.

The finished output product module 40 is shown as a tray 41, on which different sheets may be stacked, but may also comprise a stapler, a hole pucher etc. The various modules are controlled by a control unit to have their actions coordinated. This control unit generates page start and line start signals for the various modules.

Figure 2:
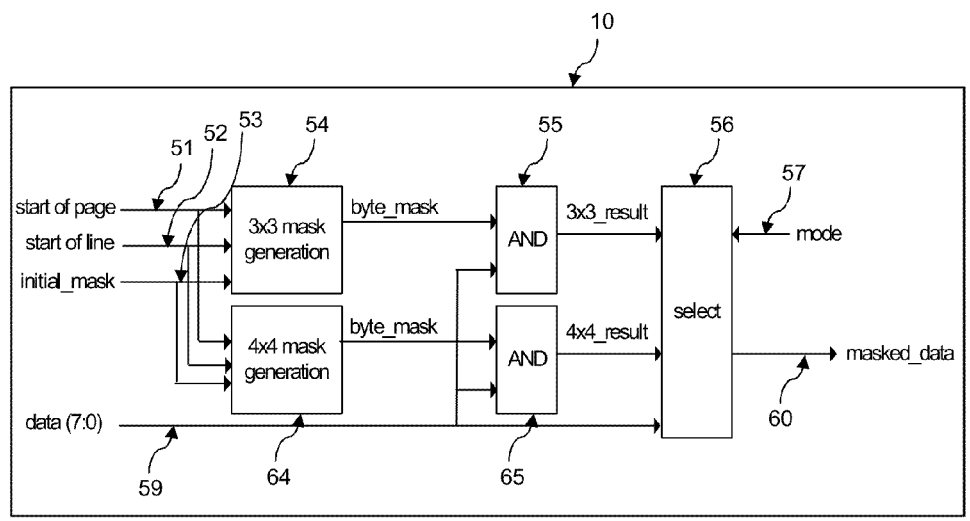
FIG. 2 shows a diagram of a module that applies a mask to image data.

In FIG. 2, a mask module in accordance with the present invention is shown, that may be part of the converter 10. In this module, a mask is applied to the print signal that is derived from the image data. The image data comprises rows of pixels. These rows are addressed at least two times, at the start of line signal 52, to constitute print line data 59. Each print line comprises an integer number of bytes. At the start of page signal 51, an initial_mask, or page mask, is loaded from a control unit to mask generation units 54 and 64. In this embodiment, two different masks are applied to the print line data in parallel. The mask generation units 54, 64 shuffle the masks for each new line that is generated and provide a byte_mask for every data byte in a print line. The byte_masks and data byte are passed on to AND filters 55 and 65, where the operation on the print data takes place. A select unit 56 selects either the image data byte from the print line data 59 or one of the results from the filters as masked_data 60 that are passed to the image forming module 11 (FIG. 1).

Figure 3:
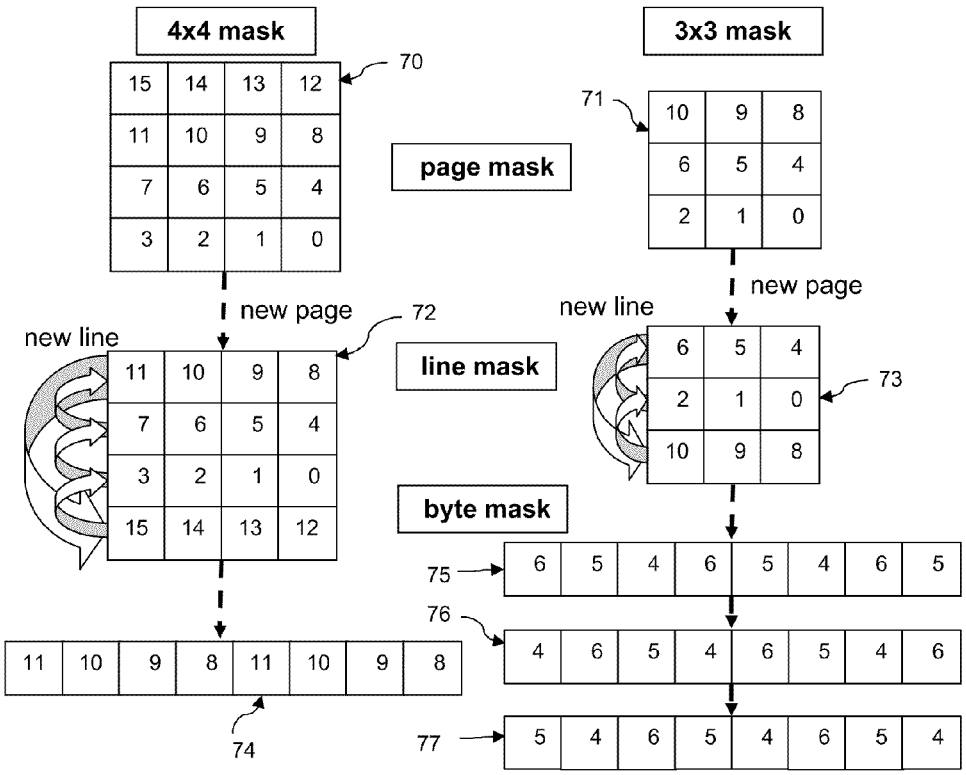
FIG. 3 shows how a byte mask is derived from a predefined mask.

In FIG. 3, two shuffle processes as performed by mask generation units 54, 64 are shown. One process concerns the shuffling of a 4×4 mask and one the shuffling of a 3×3 mask. Each mask comprises elements that correspond to print pixels, and have a value of 0 or 1, as will be shown in FIG. 4. The value 0 indicates that no marking material is applied for the corresponding print pixel, independent of the value of the associated image pixel, and the value 1 indicates that marking material is applied or not for the corresponding print pixel, conform the pixel value of the associated image pixel. By arranging the values of the elements of a mask in a word of two bytes, a mask may be defined by a numerical value corresponding to the two bytes.

In FIG. 3, matrix 70 shows bit positions in a two-byte word corresponding to elements in a 4×4 mask. A page mask indicates the definition of a predefined mask that is passed by a control unit to mask generation unit 64 at the start of a new page. At the start of a new line, rows of a line mask are interchanged as indicated in matrix 72. The upper row of matrix 72 is used to form a byte mask, the upper row arranged two times after each other in a row 74. The byte composed from the indicated matrix elements, is passed to AND filter 65 in FIG. 2.

Similarly, matrix 71 shows the bit positions in a two-byte word corresponding to elements in a 3×3 mask. At the start of a page, a predefined page mask is passed by a control unit to mask generation unit 54. At the start of a new line, rows of a line mask are interchanged as indicated in matrix 73. The upper row of matrix 73 is used to form a byte mask, which depends on the position of a byte of print data in a print line, as indicated by three byte mask 75, 76, and 77. The byte composed from the indicated matrix elements is passed to AND filter 55 in FIG. 2.

Figure 4:
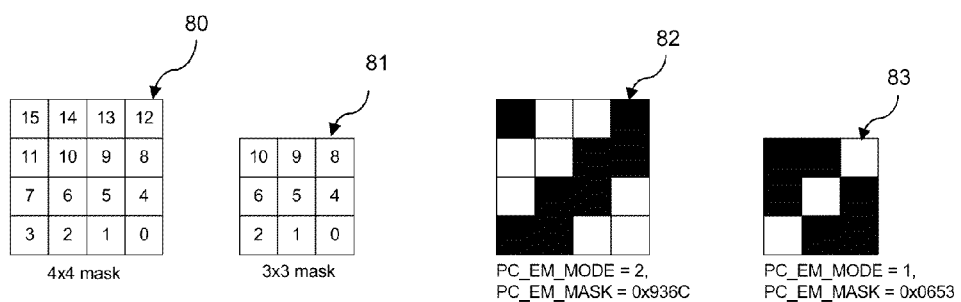
FIG. 4 shows examples of masks that may be applied to the image data in accordance with the present invention.

In FIG. 4, an example for both a 4×4 and a 3×3 mask is shown. Mask elements shown by a black square, represent a logical 1 and a white square indicates a logical 0. PC_EM_MASK is a logical variable that is used by a control unit to define a mask. An element 80 is the twelfth bit in a 4×4 mask, whose value is 1, indicated by the black square 82 and expressed in the hexadecimal value 0×9. For a 3×3 mask, an upper right element 81 is the eighth bit, whose value is 0, indicated by the white square 83, and expressed in the hexadecimal value 0×6. White entries block the image data for the print pixel, preventing the application of marking material.

Figure 5A:
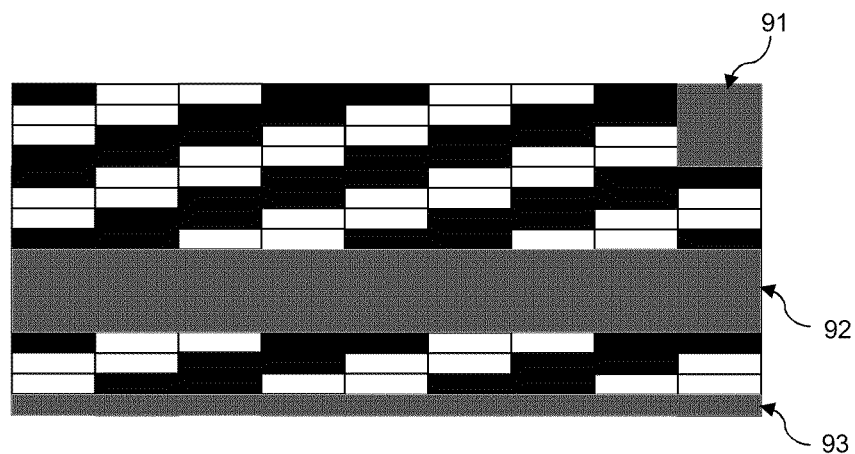
FIGS. 5A-5B show examples of binary patterns as defined by a mask in accordance with the present invention.
Figure 5B:
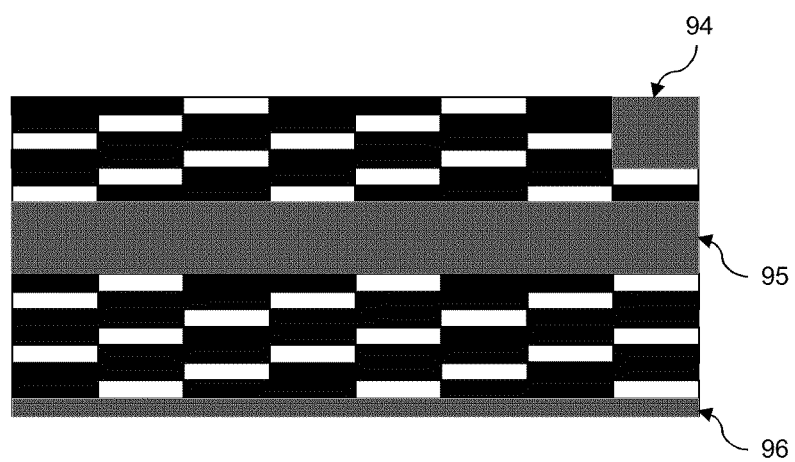

In FIG. 5 A, a resulting blocking pattern for an image filtered by a 4×4 mask of FIG. 4, is shown. White rectangles indicate print pixels for which the image data are blocked, preventing the application of marking material, independent of the value of the associated image pixel. In the upper right corner of the pattern, image pixel 91 is indicated. Each image pixel is referenced four times in this embodiment. A row of image pixels 92 is indicated, as well as a print line 93. As can be seen, a row of image pixels comprises four print lines.

In FIG. 5 B, a resulting blocking pattern for a 3×3 mask of FIG. 4 is shown. There are four print pixels for each image pixel 94 and a row of image pixels 95 comprises four print lines 96. Note that in this pattern one out of three print pixels is blocked from printing marking material.

Further embodiments of the invention may be readily envisaged that will fall under the scope of the appended claims.

The invention claimed is:

1. A method for reducing an amount of marking material to be used for printing an image on a receiving material using a printing process, the image comprising image pixels, each image pixel having a pixel value selected from a first value indicating that marking material is to be applied and a second value indicating that no marking material is to be applied, wherein the printing process is configured to apply print pixels and wherein each image pixel is associated with at least two print pixels, the method comprising the step of generating a print signal that indicates for each print pixel whether marking material is to be applied or not based on the corresponding pixel value, wherein the step of generating the print signal comprises filtering the print pixels using a predefined mask that defines for which print pixels no marking material is to be applied independent of the pixel value of the associated image pixel.

2. The method according to claim 1, wherein the print pixels for which no marking material is to be applied are arranged in a regular pattern.

3. The method according to claim 2, in which a repetition length of the mask, which is the number of pixels between repetitive sequences of mask values, is three print pixels.

4. The method according to claim 1, wherein for each image pixel at least one of the associated print pixels is set to apply marking material or not, conform the pixel value of the associated image pixel.

5. The method according to claim 1, wherein the printing process is configured to have a first print resolution, which corresponds to a number of print pixels per unit length, in a first direction and a second print resolution in a second direction, wherein the two directions are perpendicular to each other and the two print resolutions are substantially different from each other.

6. The method according to claim 1, wherein the marking material is toner.

7. The method according to claim 6, wherein the toner is applied to print pixels in a row in an axial direction of a rotating cylinder with electrodes in a circumferential direction of the cylinder, the electrodes being able to attract or not attract the toner, wherein a print resolution, which corresponds to a number of print pixels per unit length, in the circumferential direction, is selectable.

8. The method according to claim 1, wherein the level of reducing the amount of marking material is selected by a user by selecting one of a set of at least two available predefined masks.

9. A print engine that is configured to print an image by a print process, the image comprising image pixels, each image pixel having a pixel value selected from a first value indicating that marking material is to be applied and a second value indicating that no marking material is to be applied, wherein the printing process is configured to apply print pixels and wherein each image pixel is associated with at least two print pixels, the print engine comprising a module for generating a print signal that indicates for each print pixel whether marking material is to be applied or not based on the corresponding pixel value, the module comprising a filtering unit to filter the print pixels using a predefined mask that defines for which print pixels no marking material is to be applied independent of the pixel value of the associated image pixel.

* * * * *